W. W. REYNOLDS.
Improvement in Platform-Scales.
No. 132,321. Patented Oct. 15, 1872.
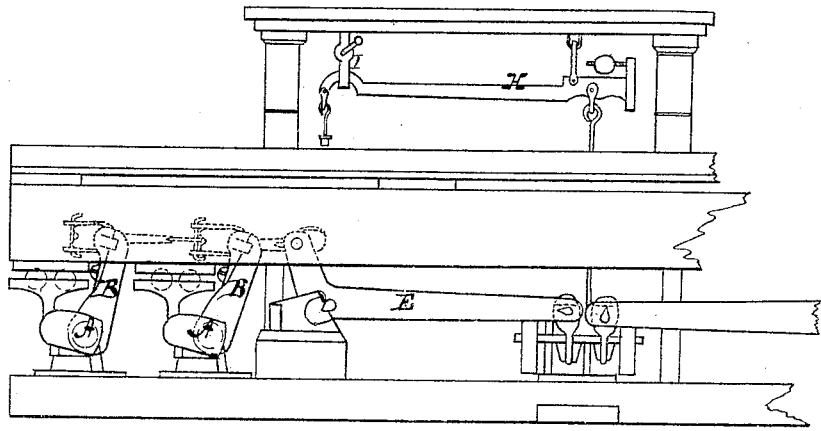
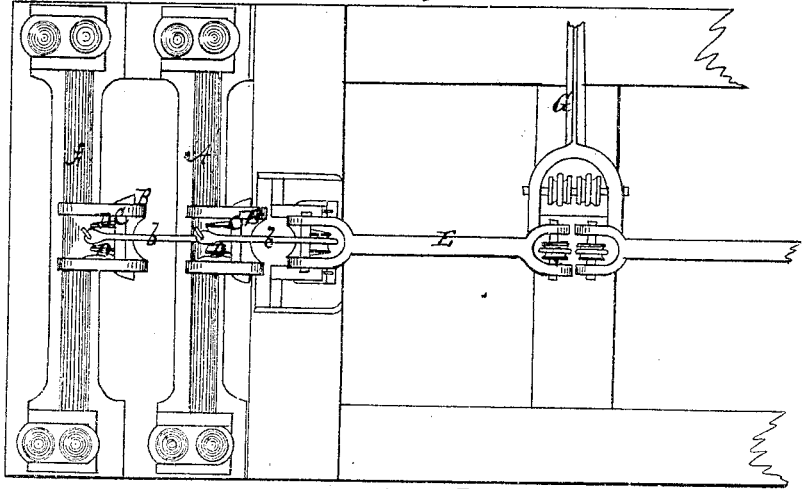
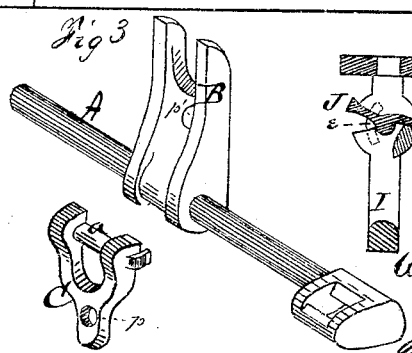
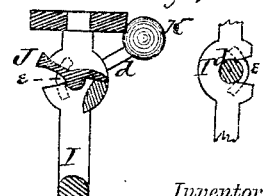
Witnesses:
Inventor.
Wm. W. Reynolds
per
Alexander Mason,
Attorneys.

UNITED STATES PATENT OFFICE.

WILLIAM W. REYNOLDS, OF BRANDON, VERMONT, ASSIGNOR TO THE BRANDON MANUFACTURING COMPANY, OF SAME PLACE.

IMPROVEMENT IN PLATFORM-SCALES.

Specification forming part of Letters Patent No. 132,321, dated October 15, 1872.

*To all whom it may concern:*

Be it known that I, WILLIAM W. REYNOLDS, of Brandon, in the county of Rutland and in the State of Vermont, have invented certain new and useful Improvements in Platform-Scales; and do hereby declare that the following is a full, clear, and exact description thereof, reference being had to the accompanying drawing and to the letters of reference marked thereon making a part of this specification.

The nature of my invention consists in certain improvements in platform-scales for weighing cars or other vehicles running on railways, whereby the difficulty so often experienced in transmitting to the weigh-beam accurately (in consequence of the torsion of the levers used) is entirely obviated.

In order to enable others skilled in the art to which my invention appertains to make and use the same, I will now proceed to describe its construction and operation, referring to the annexed drawing, in which—

Figure 1 is a side elevation, and Fig. 2 a plan view, of a part of a platform-scale with my improvements attached; Figs. 3, 4, and 5 are detached views of certain parts thereof.

A A represent the cross-shafts, each of which is provided with an arm, B, in the center. Each shaft A, with its arm B, is made solid in one piece, the arm standing at right angles with the fulcrum and power bearings, and as the shaft extends from one bearing to the other it renders the liability of any disarrangement almost impossible, and also distributes the strain of the load more equally and allows of the use of one transmitting-rod. At the end of each arm is a vibrating knife-edge supporter, C, having knife-edge $a$ and pivot $p$, as shown in Fig. 3, which engages with a solid block-bearing, D, attached to a rod, $b$, by which the transmission of the load is accomplished without torsion and consequently accurately. The solid block-bearing D is constructed as shown in Fig. 5, its formation admitting of another rod, $b$, which also transmits from another section of the scale, the same bolt or pin which holds the block D in place also holding or connecting with the rod, which transmits the load from the section back, thus saving a link, bar, or other piece, making it simple but equally effective. The inner rod $b$ is carried to the bent lever E, which transmits to the lever G, and this to the weigh-beam H. I represents the beam-rack, which heretofore has been made with a pad or stop, which holds the weigh-beam down when not in use, and turned up when in the act of weighing to allow the beam to vibrate, said pad or stop having been held in both positions by the use of springs, which are very expensive, or with balance-weights directly over the weigh-beam and between the beam-rack bars, which is not convenient to operate. To overcome both of these objections the stop J and the rod $d$, on which it turns, and the balance-ball K at the end, are all in one piece, with the rod bent in such a manner that it will hold the stop J in either position without the use of springs. The position of the balance-ball K is outside of the rack I, where it can be conveniently worked. In the side of the rack I is a V-shaped slot, as shown in Fig. 4, to admit the stop J, the same being held in position by the use of a bent wire, $e$, which is passed over the rod $d$ and its ends inserted in holes at an angle, which holds it securely, the whole being covered with soft metal and entirely filling the V-shaped slot in the rack.

Having thus fully described my invention, what I claim as new, and desire to secure by Letters Patent, is—

1. The knife-edge supporter C having knife-edge $a$, and pivoted at $p$ to the arm B for self-adjustment with the block-bearing D, substantially as set forth.

2. The combination of the shafts A with arms B, bearing-blocks D, vibrating knife-edge supporters C, transmitting-rods $b$, and levers E G, all substantially as and for the purposes set forth.

In testimony that I claim the foregoing I have hereunto set my hand this 27th day of June, 1872.

WM. W. REYNOLDS.

Witnesses:
ERASTUS F. DANA,
OSCAR ROBINSON.